United States Patent [19]
Ohmi et al.

[11] Patent Number: 6,035,893
[45] Date of Patent: Mar. 14, 2000

[54] SHUTOFF-OPENING DEVICES AND FLUID CONTROL APPARATUS COMPRISING SUCH DEVICES

[75] Inventors: Tadahiro Ohmi, 1-17-301, Komegafukuro 2-chome, Aoba-ku, Sendai-shi, Miyagi; Michio Yamaji, Osaka; Nobukazu Ikeda, Osaka; Masayuki Hatano, Osaka; Kosuke Yokoyama, Osaka; Shigeaki Tanaka, Osaka, all of Japan

[73] Assignees: Tadahiro Ohmi, Sendai; Fujikin Incorporated, Osaka, both of Japan

[21] Appl. No.: 08/882,291

[22] Filed: Jun. 25, 1997

[30] Foreign Application Priority Data

Jun. 25, 1996 [JP] Japan .................................. 8-164673

[51] Int. Cl.[7] ............................................ F16K 11/10
[52] U.S. Cl. ..................... 137/597; 137/884; 137/883; 137/606
[58] Field of Search ................... 137/597, 884, 137/883, 606

[56] References Cited

U.S. PATENT DOCUMENTS

| | | | |
|---|---|---|---|
| 4,703,913 | 11/1987 | Hunkapiller | 137/606 |
| 4,915,688 | 4/1990 | Bischof et al. | 137/606 X |
| 5,083,742 | 1/1992 | Wylie et al. | 137/885 |
| 5,313,985 | 5/1994 | Donner | 137/884 |
| 5,642,756 | 7/1997 | Lawrence et al. | 137/884 |
| 5,653,259 | 8/1997 | Ramstad | 137/884 |
| 5,769,110 | 6/1998 | Ohmi et al. | 137/884 |

Primary Examiner—Denise L. Ferensic
Assistant Examiner—Joanne Y. Kim
Attorney, Agent, or Firm—Armstrong, Westerman, Hattori, McLeland and Naughton

[57] ABSTRACT

A valve main body is internally formed with a main channel extending from a rear end face thereof nearly to a first valve actuator, and two subchannels communicating with the main channel via second and third valve actuators, respectively. The valve main body has a slanting face extending forwardly downward and having the first valve actuator mounted thereon.

6 Claims, 10 Drawing Sheets

SHUTOFF-OPENING DEVICES AND FLUID CONTROL APPARATUS COMPRISING SUCH DEVICES

BACKGROUND OF THE INVENTION

The present invention relates to shutoff-opening devices comprising a valve main body and a plurality of valve actuators and fluid control apparatus comprising such devices.

The terms front, rear, upper, lower, right and left are herein used based on FIG. 2; the right-hand side, the left-hand side, the upper side and lower side of the drawing are referred to as front, rear, upper and lower, respectively, and the terms right and left are used for the device as it is viewed from the behind toward the front. The device may be used with the front-rear relationship as reversed, or the upper and lower side thereof positioned as the left and right sides.

Shutoff-opening devices are already known which comprise a rectangular parallelepipedal valve main body, and a plurality of valve actuators. Such a device is disposed at each of the inlet side and the outlet side of a massflow controller, or like controller, to provide a fluid control apparatus for use in semiconductor manufacturing equipment.

FIG. 17 shows a conventional shutoff-opening device 61. The device 61 comprises a rectangular parallelepipedal valve main body 63, and three valve actuators 64, 65, 66 mounted on the upper surface of the main body and arranged side by side longitudinally thereof (in the front-rear direction). The valve main body 63 is formed with a main channel 67 extending from the rear end face of the body 63 nearly to the front-end valve actuator 64, and three subchannels 68, 69, 70 communicating with the main channel 67 via the actuators 64, 65, 66, respectively. The upper surface of the valve body 63 is flat and parallel to the lower surface thereof. The actuators 64, 65, 66 are mounted on the flat surface, and spaced apart by equal distances.

When a fluid flows from the main channel 67 into the first subchannel 68, the dead volume (stagnant portion of fluid) of the device 61 is only short channels 71, 72 connecting the main channel 67 to the second and third actuators 65, 66. When the fluid flows from the main channel 67 into the second channel 69, the dead volume is the short subchannel 72 interconnecting the main channel 67 and the third valve actuator 66, and front end portions 67a, 67b of the main channel 67 positioned between the first valve actuator 64 and the second valve actuator 65. Further when the fluid flows from the main channel 67 into the third subchannel 70, the dead volume is the short channel 71 interconnecting the main channel 67 and the second valve actuator 65, the main channel front end portions 67a, 67b positioned between the first and second valve actuators 64, 65, and an intermediate portion 67c of the main channel 67 positioned between the second end third actuators 65, 66.

With the shutoff-opening devices and fluid control devices for use in semiconductor manufacturing equipment, it is critical to diminish the dead volume which reduces the purity of the process gas. It is also required that these devices be reduced in content volume, entire volume and weight, whereas the conventional devices still remain to be improved in these points.

SUMMARY OF THE INVENTION

An object of the present invention is to provide shutoff-opening devices which are diminished in dead volume, volume and weight as compared with conventional devices and to provide fluid control devices comprising such shutoff-opening devices.

The present invention provides a shutoff-opening device comprising a generally rectangular parallelepipedal valve main body, and a plurality of channel on-off valve actuators mounted-on an upper surface of the valve main body and arranged side by side longitudinally thereof, the valve main body being internally formed with a main channel extending from a rear end face of the main body or a rear end portion lower surface of the main body nearly to the valve actuator at a front end of the main body, and with a plurality of subchannels communicating with the main channel via the respective valve actuators, the shutoff-opening device being characterized in that the surface of the valve main body includes a slanting face extending forwardly downward and having the front-end valve actuator mounted thereon.

The forwardly downward inclination of the slanting face is preferably 15 degrees to 60 degrees, more preferably 20 degrees to 45 degrees. If the inclination is small, the advantage resulting from this feature is small, whereas if the inclination is great, the front-end valve actuator becomes forwardly projected beyond the front end of the valve main body, increasing the possibility of the actuator interfering with other members. Thus, the inclination should be within the preferred range described in view of the size of the valve actuators and the size of the fluid control apparatus to be provided by such shutoff-opening devices.

With the shutoff-opening device of the present invention, the upper surface of the valve main body is in the form of a slanting face extending forwardly downward at the portion thereof having the front-end valve actuator mounted thereon. This reduces the volume of the front upper portion of the valve main body, the front-to-rear length of the front portion thereof, and the content volume, volume and weight of the shutoff-opening device. The main channel includes a front end portion positioned between the front-end valve actuator and the valve actuator immediately adjacent thereto which portion accounts for a major portion of the dead volume of the shutoff-opening device. This main channel front end portion diminishes with the reduction in the length of front portion of the valve main body, consequently decreasing the dead volume of the shutoff-opening device.

The shutoff-opening device is provided, for example, at each of the inlet side and the outlet side of a massflow controller, or like controller, to constitute a fluid control device for use in semiconductor manufacturing equipment.

Among the subchannels of each shutoff-opening device in this case, it is desired to use the subchannel remotest from the controller for the process gas and to use the subchannel adjacent to this subchannel for a purge gas. The dead volume during the flow of the process gas is then limited to a short channel or short channels connecting the main channel to the other valve actuator or actuators toward the rear, with the result that the gas remaining upon changing over the process gas to other gas can be removed within a short period of time.

A suitable number of fluid control devices of the type described are used for providing a fluid control apparatus. It is desired in this case that the valve main bodies of the shutoff-opening devices be equal in front-to-rear length irrespective of the number of valve actuators. The first valve actuators of the shutoff-opening devices are then aligned, rendering the shutoff-opening devices easy to operate.

Preferably, the subchannel included in the subchannels of each shutoff-opening device and communicating with the main channel via the front-end valve actuator has an opening formed in a front end face or lower surface of the valve main body, the other subchannel or subchannels have an opening in the lower surface of the valve main body, and piping for the other subchannel or subchannels is provided under the main body. The piping means can then be in a flat arrangement under the valve main body, compacting the control apparatus in its entirety and assuring the piping portion of facilitated maintenance.

DESCRIPTION OF THE PREFERRED EMBODIMENTS

Embodiments of the invention will be described below with reference to the drawings.

Figure 1:
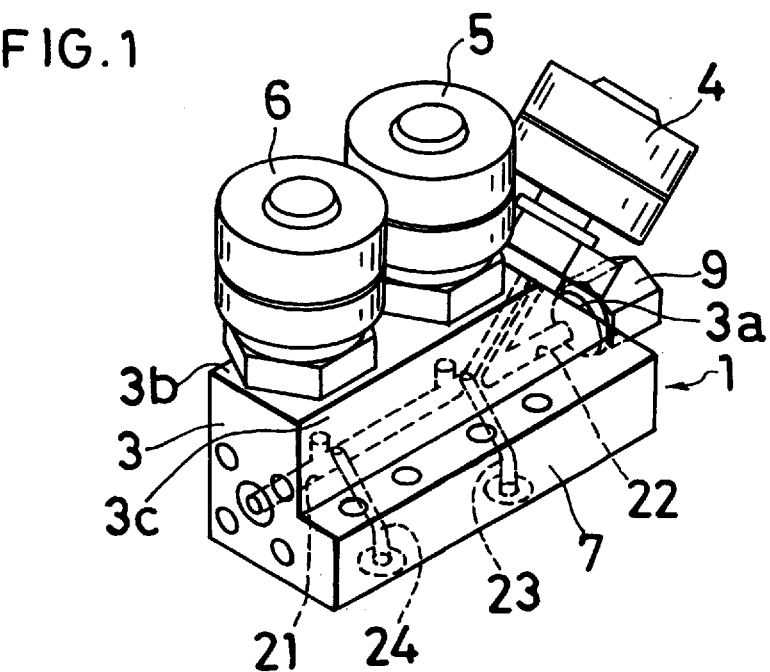
FIG. 1 is a perspective view showing a first embodiment of shutoff-opening device of the invention.
Figure 2:
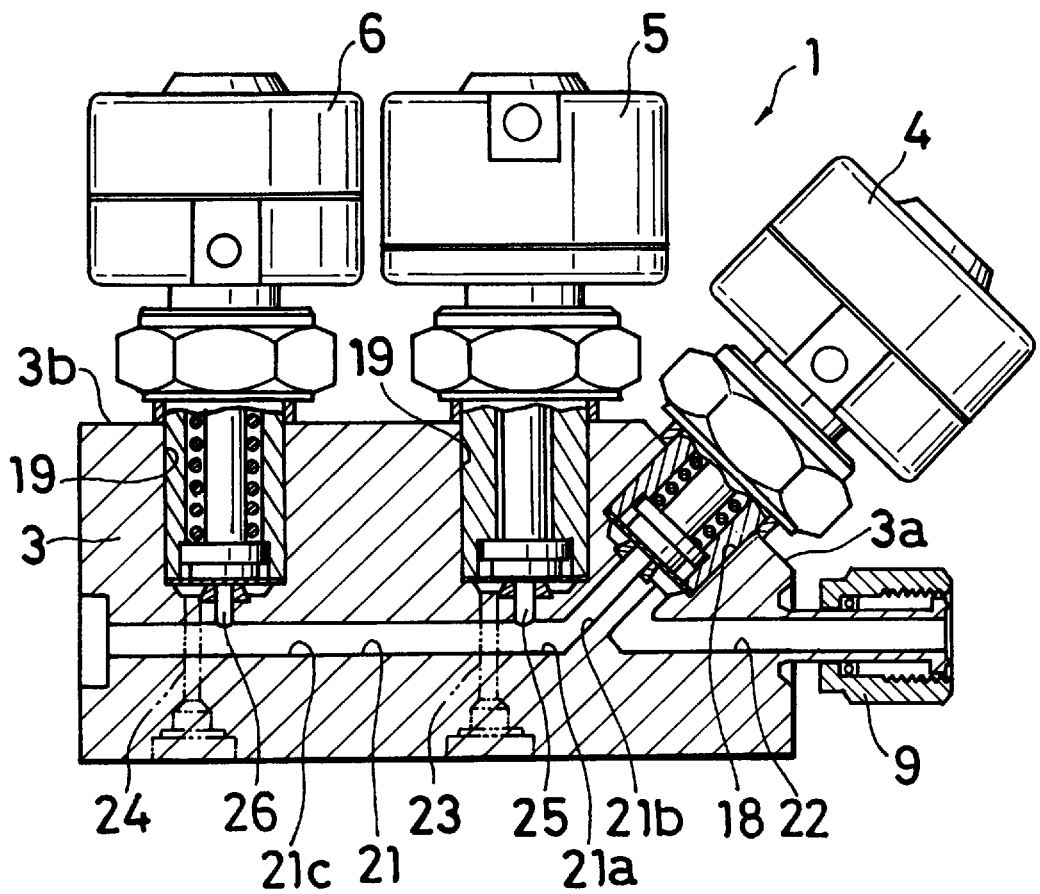
FIG. 2 is a view in longitudinal section of the same.
Figure 3:
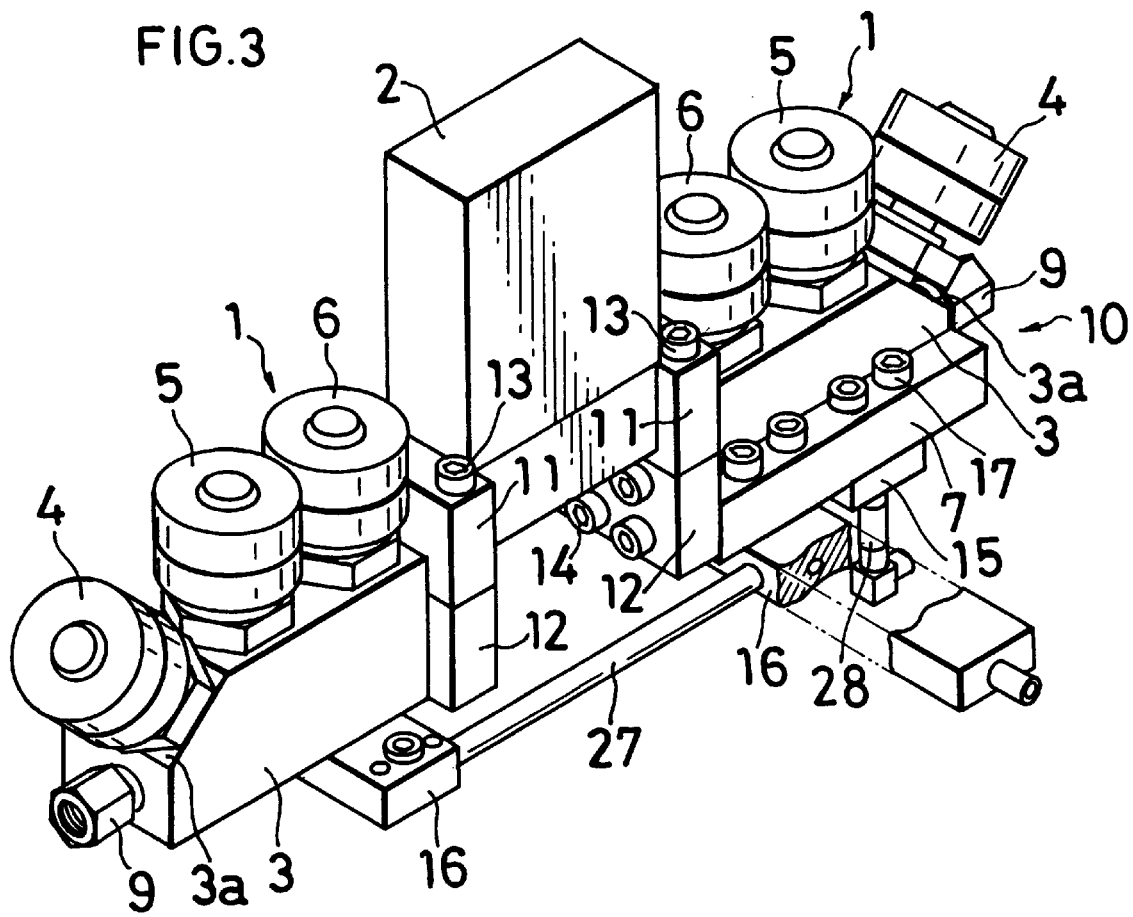
FIG. 3 is a perspective view showing a first embodiment of a fluid control device of the invention.
Figure 4:
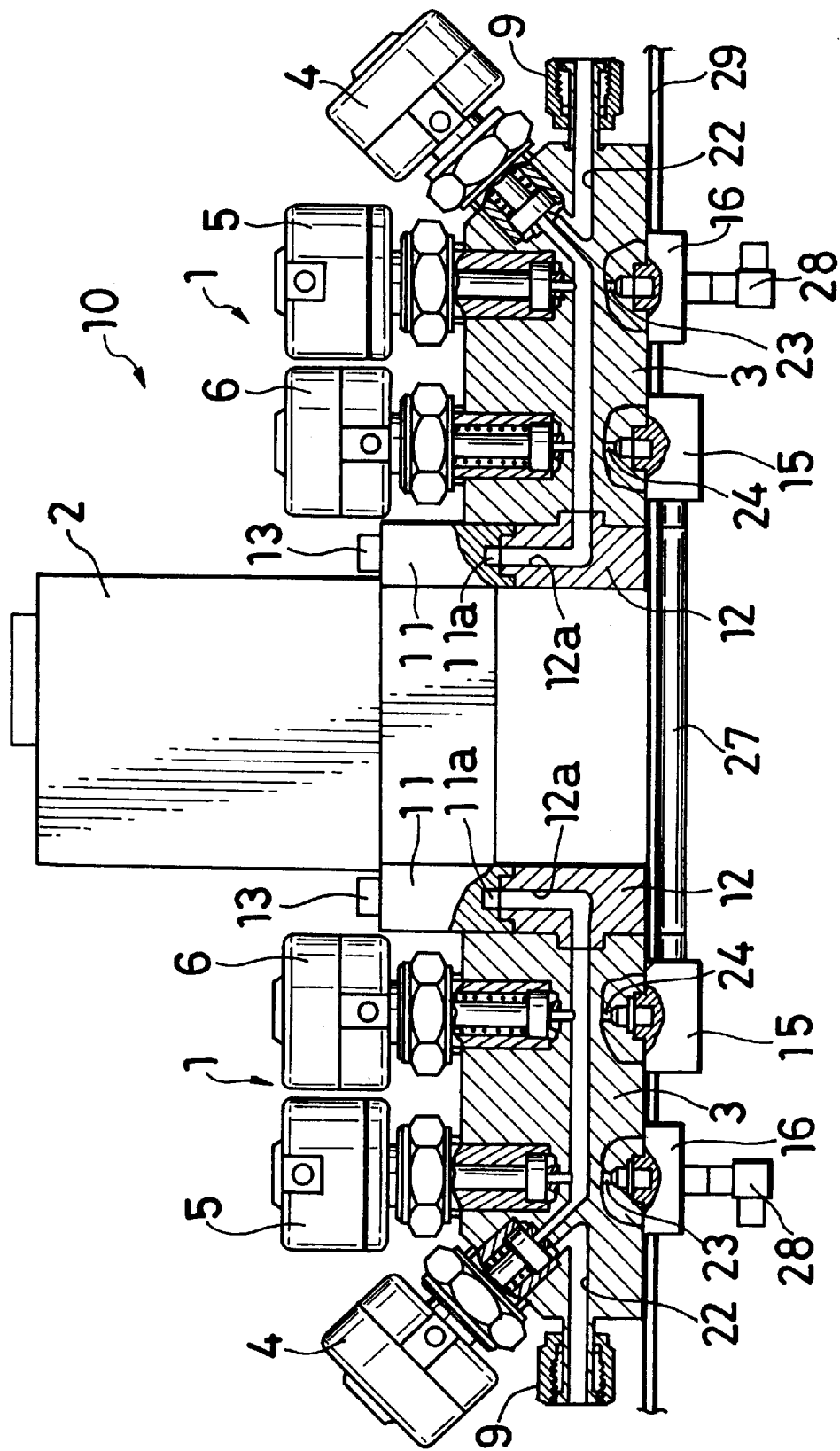
FIG. 4 is a view in longitudinal section of the same.

FIGS. 1 and 2 show a first embodiment of shutoff-opening device 1 of the invention. As shown in FIGS. 3 and 4, the shutoff-opening device 1 is disposed at the inlet side and the outlet side of a massflow controller 2 to provide a fluid control device 10.

With reference to FIGS. 1 and 2, the shutoff-opening device 1 comprises a generally rectangular parallelepipedal valve main body 3, and first (front-end), second (intermediate) and third (rear-end) channel opening-closing valve actuators 4, 5, 6. The valve main body 3 is internally formed with a main channel 21 extending straight from the rear end face of the main body 3 nearly to the location of the front-end valve actuator 4 longitudinally of the body, and first (front-end), second (intermediate) and third (rear-end) subchannels 22, 23, 24 communicating with the main channel 21 via the valve actuators 4, 5, 6, respectively. The subchannels 23, 24 communicating with the main channel 21 via the respective second and third valve actuators 5, 6 are positioned immediately in the rear of respective short channels 25, 26 extending from the main channel 21 to the second and third valve actuators 5, 6, whereas these subchannels 23, 24 are shown in broken lines as shifted leftward from the actual locations (the same as hereinafter).

The valve main body 3 is integral with a blocklike extension 7 extending from a right wall 3c of the portion thereof having the actuators 4, 5, 6 attached thereto. The extension 7 is formed with the second and third subchannels 23, 24 and serves as a screw fastening portion.

The upper surface of the valve main body 3 includes a mount face 3a in the form of a slanting face extending forwardly downward for mounting the front-end actuator 4 thereon. The remaining portion of the upper surface, i.e., a mount face 3b for the second and third actuators 5, 6, is flat and parallel to the lower surface of the body 1.

The valve actuators 4, 5, 6 are attached to the mount faces 3a, 3b perpendicular thereto. The valve main body 3 has a cavity 18 for inserting the first actuator 4, and cavities 19 for inserting the respective second and third actuators 5, 6. The cavity 18 has a smaller depth than the cavities 19. Accordingly, the first actuator 4 is shorter than the other actuators 5, 6. The valve actuators can be of the same length for insertion into cavities of the same depth. The first and third actuators 4, 6 are of the normally closed type, and the second actuator 5 of the normally open type.

The main channel 21 extends from the rear end face of the main body 3 to a location close to the front end face thereof. The first subchannel 22 has an opening in the front end face of the body 3. The front end face of the main body 3 is provided with a fitting 9 having a nut for connecting a check valve, pressure regulator, or the like, to the first subchannel 22. The second and third subchannels 23, 24 extend through the extension 7 of the main body 3 and each have an opening in the lower surface of the body 3.

With reference to FIG. 2, the dead volume of the device 1 is only the short channels 25, 26 connecting the main channel 21 to the respective second and third valve actuators 5, 6 when a fluid flows from the main channel 21 into the first subchannel 22. When the fluid flows from the main channel 21 into the second subchannel 23, the dead volume is the short channel 26 connecting the main channel 21 to the third actuator 6, and front end portions 21a, 21b of the main channel 21 which are positioned between the first and second actuators 4, 5, forming an obtuse angle. when the fluid flows from the main channel 21 into the third subchannel 24, the dead volume is the short channel 25 connecting the main channel 21 to the second actuator 5, the main channel front end portions 21a, 21b positioned between the first and second actuators 4, 5, and an intermediate portion 21c of the main channel 21 positioned between the second and third actuators 5, 6.

Figure 17:
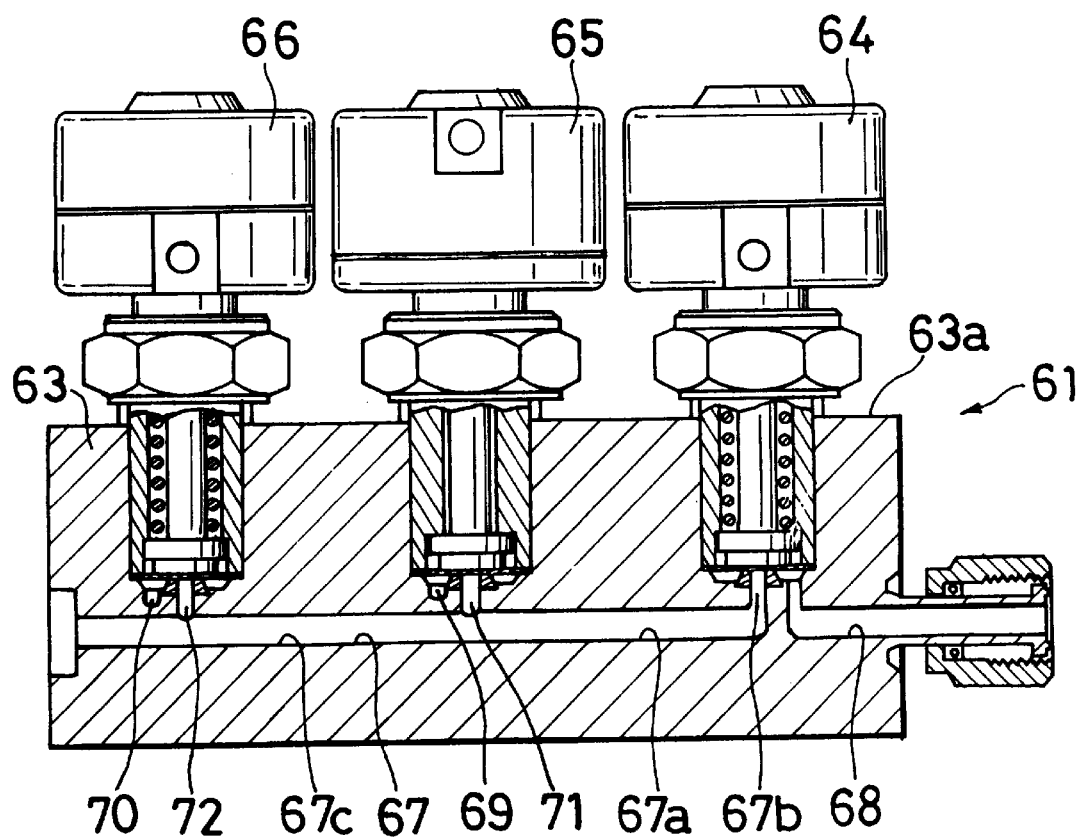
FIG. 17 is a view in longitudinal section showing a conventional shutoff-opening device.

With the shutoff-opening device 1 described, the first actuator mount face 3a included in the upper surface of the valve main body 3 is made equal in area to the first actuator mount face 63a of the conventional shutoff-opening device 61 shown in FIG. 17. Accordingly, the volume of the front upper portion of the valve main body 3 and the front-to-rear length of the front portion of the body are made smaller than in the conventional shutoff-opening device 61 by an amount attributable to the formation of the forwardly downward slanting face serving as the mount face 3a, consequently diminishing the content volume, overall volume and weight of the shutoff-opening device 1. Suppose the length of the first valve actuator mount face 63a of the conventional shutoff-opening device 61 is L, and the inclination of the slanting face is θ. The shutoff-opening device 1 is reduced by L(1−cos θ) in front-to-rear length, and by L²×cos θ×sin θ×2 in vertical section. With respect to the dead volume, the combined volume of the obtuse angle forming front end portions 21a, 21b of the main channel 21 is made smaller than the combined volume of the front end portions 67a, 67b of the main channel 67 of the conventional shutoff-opening device 61 owing to the reduction in the length of the valve main body 3, whereby the dead volume of the entire shutoff-opening device 1 is also diminished. As the inclination increases, the front end portion 21a extending straight from the portion 21c of the main channel 21 diminishes with an increase in the length of the bent front end portion 21b. However, the diminution of the overall dead volume increases with an increase in the inclination.

FIGS. 3 and 4 show a fluid control device, which comprises a massflow controller 2, and the shutoff-opening device 1 installed at each of the inlet side (left side in FIG. 4) and the outlet side (right side in FIG. 4). The shutoff-opening device 1 shown in FIGS. 1 and 2 is mounted on the inlet side with their front and rear ends reversed.

With the shutoff-opening device 1 at the inlet side, the first subchannel 22 remotest from the massflow controller 2 is used for the inflow of process gas, the second subchannel 23 adjacent to the subchannel 22 for the inflow of purge gas, and the third subchannel 24 closest to the controller 2 for evacuation. With the shutoff-opening device 1 at the outlet side, the first subchannel 22 remotest from the controller 2 is to communicate with a process chamber, and the second subchannel 23 with an exhaust gas duct to serve as a purge port.

An upper channel block 11 having a channel 11a opened at its lower surface is provided in a projecting manner at the lower end of each of the inlet and outlet sides of the massflow controller 2. A lower channel block 12 is disposed beneath the block 11. The lower and upper channel blocks 12, 11 are fastened together by two controller installing screws 13 screwed into the upper block 11 from above. The lower block 12 is formed with a channel 12a for holding the channel 11a of the upper block 11 in communication with the main channel 21 of the valve main body 3. The lower block 12 is fastened to the valve main body 3 with device installing screws 14 driven in through the lower block 12. Piping channel blocks 15, 16 for the respective second and third subchannels 23, 24 are fastened to the extension 7 with piping installing screws 17 driven in through the extension 7 from above. The third subchannel 24 of the inlet-side shutoff-opening device 1 and the third subchannel 24 of the outlet-side shutoff-opening device 1 are connected to a vacuum pump (not shown) after their piping channel blocks 15, 15 are interconnected by a pipe 27. A fitting 28 is attached to the lower side of the block 16 for the second subchannel 23. The fitting 28 has a pipe joint portion which is positioned at a lower level than the evacuation pipe 27. The purge gas piping is therefore unlikely to interfere with the evacuation pipe 27. When the fluid control device 10 is to be installed, the massflow controller 2 and the shutoff-opening devices 1 are mounted on the upper surface of a base plate 29 with the piping channel blocks 15, 16 positioned beneath the lower surface of the base plate 29 as shown in FIG. 4.

If the massflow controller 2 of the fluid control device 10 malfunctions, the controller 2 is removable upward for replacement by removing the controller installing screws 13. Further if the shutoff-opening device 1 fails, the device 1 can be removed upward for replacement by removing the device installing screws 14 and the piping installing screws 17.

When the process gas flows through the fluid control device described, the dead volume is limited only to the short channels 25, 26 connecting each main channel 21 to the corresponding second and third valve actuators 5, 6.

Figure 5:
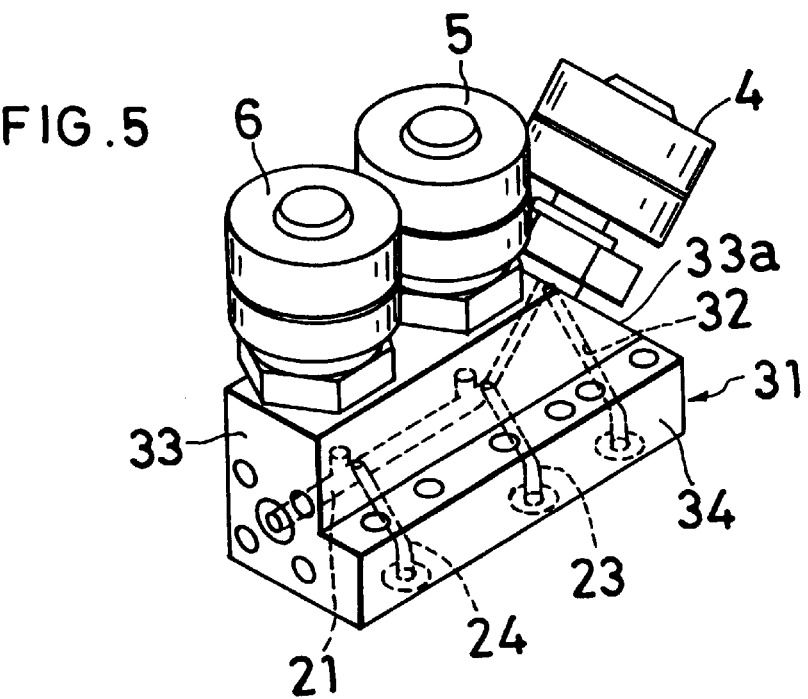
FIG. 5 is a perspective view showing a second embodiment of shutoff-opening device of the invention.
Figure 6:
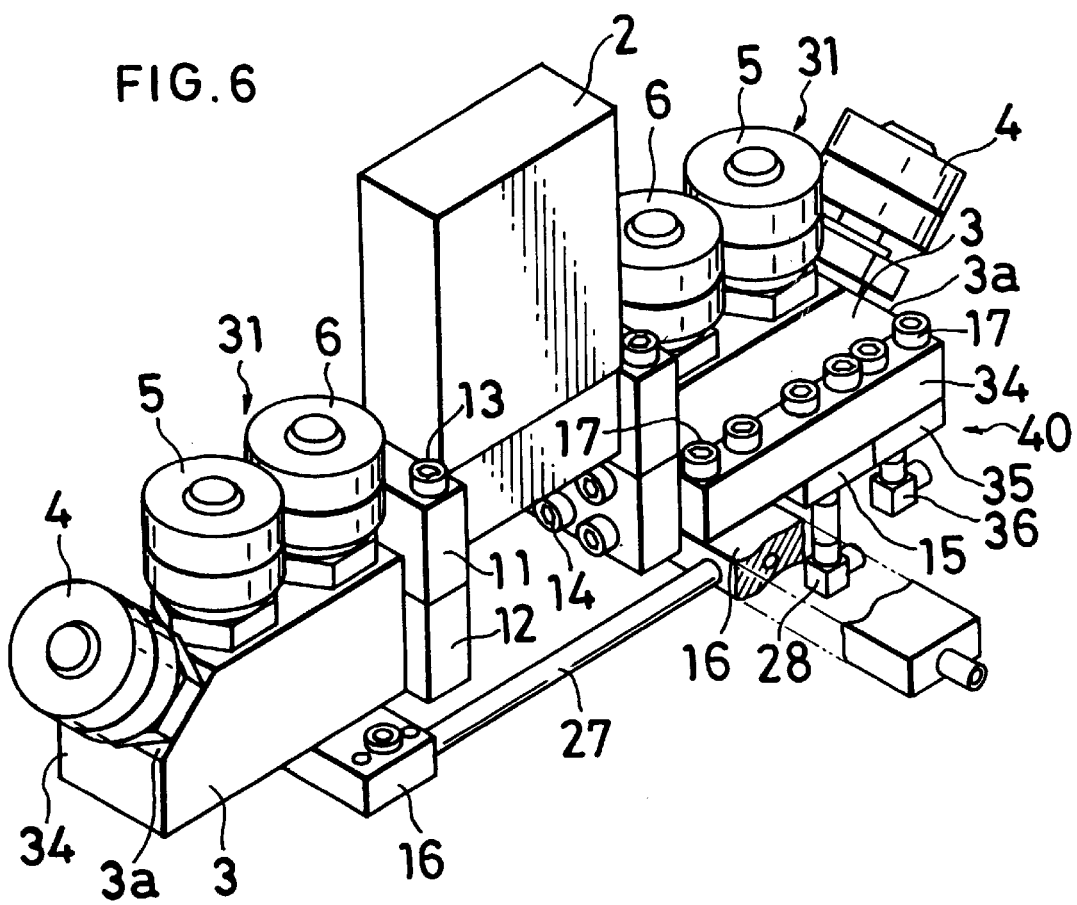
FIG. 6 is a perspective view showing a second embodiment of fluid control device of the invention.

FIG. 5 shows a second embodiment of shutoff-opening device 31 of the invention. The shutoff-opening device 31 is provided at each of the inlet side and outlet side of a massflow controller 2 to constitute a fluid control device 40 as seen in FIG. 6. This shutoff-opening device 31 is different from the shutoff-opening device 1 of the first embodiment in that a first subchannel 32 has an opening in the lower surface of a valve main body 33. Throughout the drawings showing the first and second embodiments, like parts are designated by like reference numerals and symbols and will not be described repeatedly hereinafter. With reference to FIG. 5, the fitting 9 at the front end of the valve main body 3 shown in FIG. 1 is removed, and the main body 33 has a blocklike extension 34, which is formed with the first subchannel 32 which has an opening in the lower surface of the valve main body, in addition to the second and third subchannels 23, 24. As seen in FIG. 6, the extension 34 has connected thereto a piping channel block 35 communicating with the first subchannel 32, in addition to the piping channel blocks 15, 16 in communication with the respective second and third subchannels 23, 24. A fitting 36 provided under this piping channel block 35 has a pipe joint, which is positioned at a level intermediate between the evacuation pipe 27 and the fitting 28 communicating with the second subchannel 23. Accordingly, the process gas piping is unlikely to interfere with the purge gas piping or the evacuation pipe 27.

Although the shutoff-opening devices 1 shown in FIGS. 1, 2 and 5 have three valve actuators 4, 5, 6, two actuators are used when there is no need for the evacuation subchannel 24. In this case, the third valve actuator 6 is of course eliminated with the front-to-rear length of the valve main body shortened, whereas FIG. 7 shows a valve main body 43 which has the same length as the foregoing embodiments but which is formed with neither of the cavity 19 for inserting the third actuator 6 and the evacuation subchannel 24.

Figure 7:
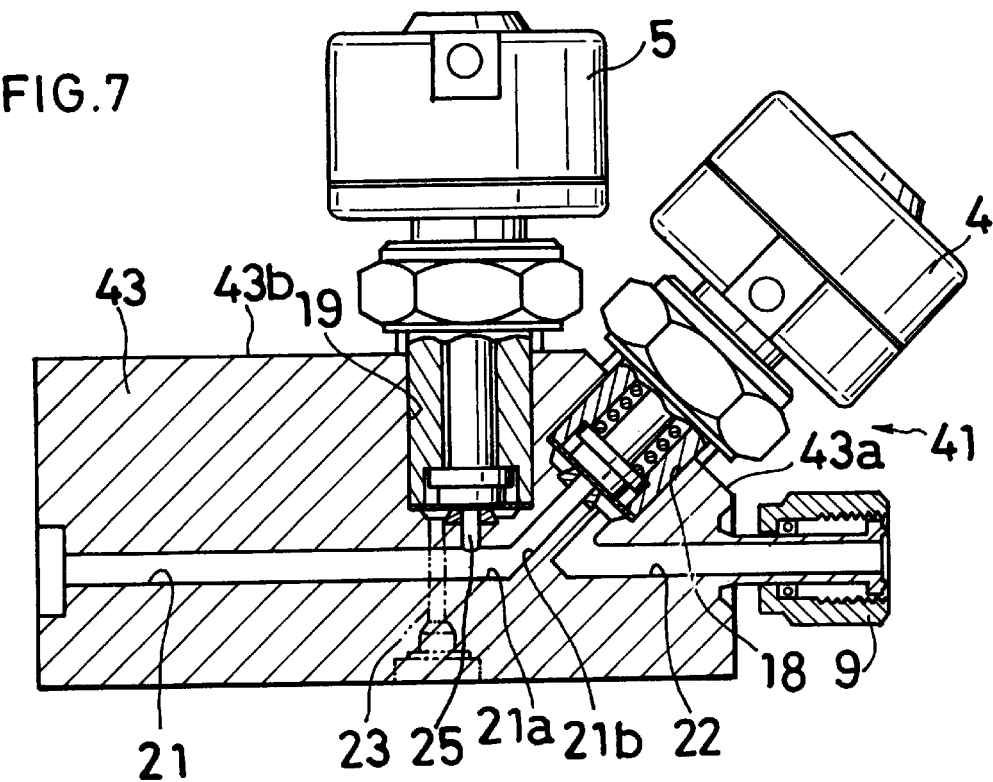
FIG. 7 is a view in longitudinal section showing a third embodiment of shutoff-opening device of the invention.

FIG. 7 shows a shutoff-opening device 41, which comprises a generally rectangular parallelepipedal valve main body 43, and first (front-end) and second valve actuators 4, 5 mounted on the upper surface of the main body 43 and arranged side by side longitudinally thereof (front-rear direction). The main body 43 is internally formed with a main channel 21 extending from the rear end face of the body 43 to a location near the front end thereof, and first (front-end) and second subchannels 22, 23 adapted to communicate with the main channel 21 under the control of the respective actuators 4, 5. The upper surface of the valve main body 43 includes a mount face 43a in the form of a slanting face extending forwardly downward and having the front-side first actuator 4 mounted thereon. The other portion of the surface, i.e., mount face 43b, is flat and parallel to the lower surface of the body 43. The flat face 43b has such an area that two valve actuators can be mounted thereon. The front half of the flat face 43b has the second actuator 5 mounted thereon.

Figure 8:
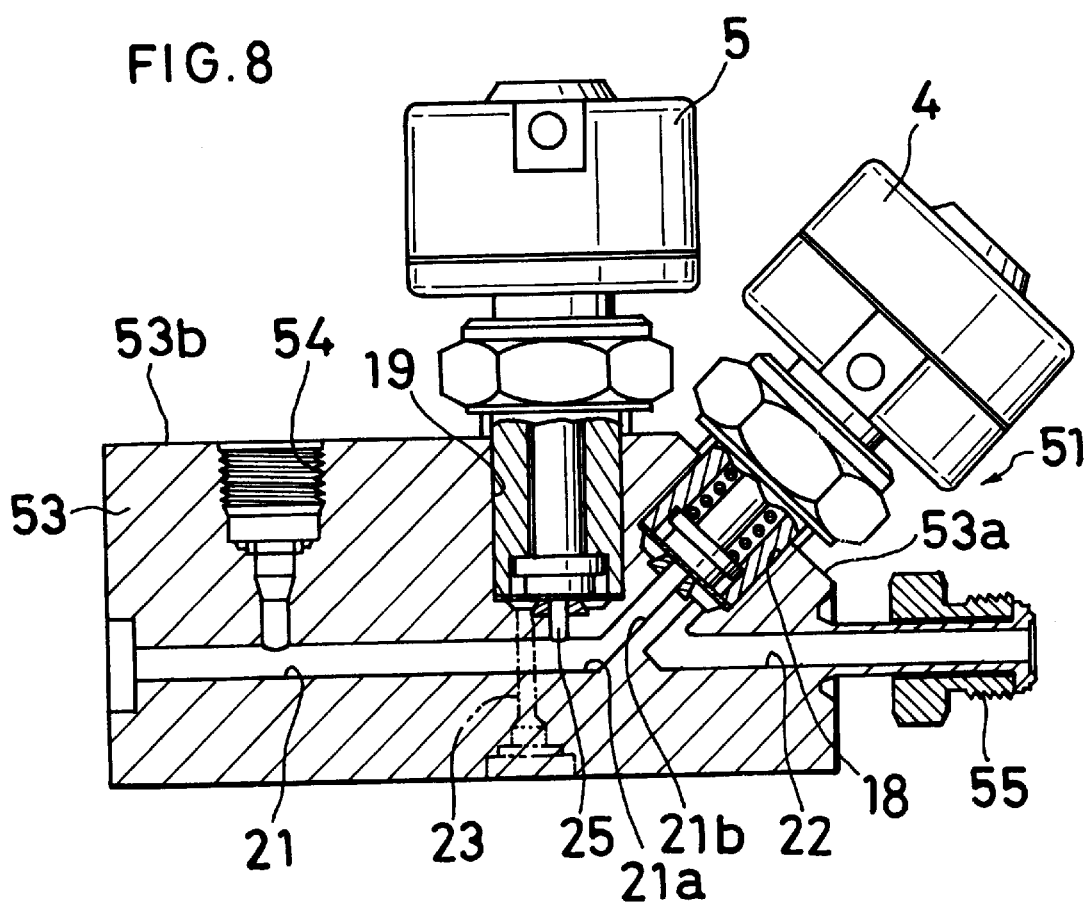
FIG. 8 is a view in longitudinal section showing a fourth embodiment of shutoff-opening device of the invention.

A pressure sensor can be mounted on the portion of the shutoff-opening device shown in FIG. 7 at the portion from which the third actuator 6 is removed as shown in FIG. 8. With reference to FIG. 8, a shutoff-opening device 51 thus adapted comprises a generally rectangular parallelepipedal valve main body 53, and first (front-end) and second valve actuators 4, 5 mounted on the upper surface of the main body 53 and arranged side by side longitudinally thereof (front-rear direction). The main body 53 is internally formed with a main channel 21 extending from the rear end face of the body 53 to a location near the front end thereof, and first (front-end) and second subchannels 22, 23 adapted to communicate with the main channel 21 under the control of the respective actuators 4, 5. The upper surface of the valve main body 53 includes a mount face 53a in the form of a slanting face extending forwardly downward and having the front-end first actuator 4 mounted thereon. The other portion of the surface, i.e., mount face 53b, is flat and parallel to the lower surface of the body 53. The flat face 53b has such an area that two valve actuators can be mounted thereon. The front half of the flat face 53b has the second actuator 5 mounted thereon. The rear half portion is formed with a threaded bore 54 for mounting a pressure sensor. The valve main body 53 is provided at its front end with a fitting 55 which is externally threaded.

Figure 9:
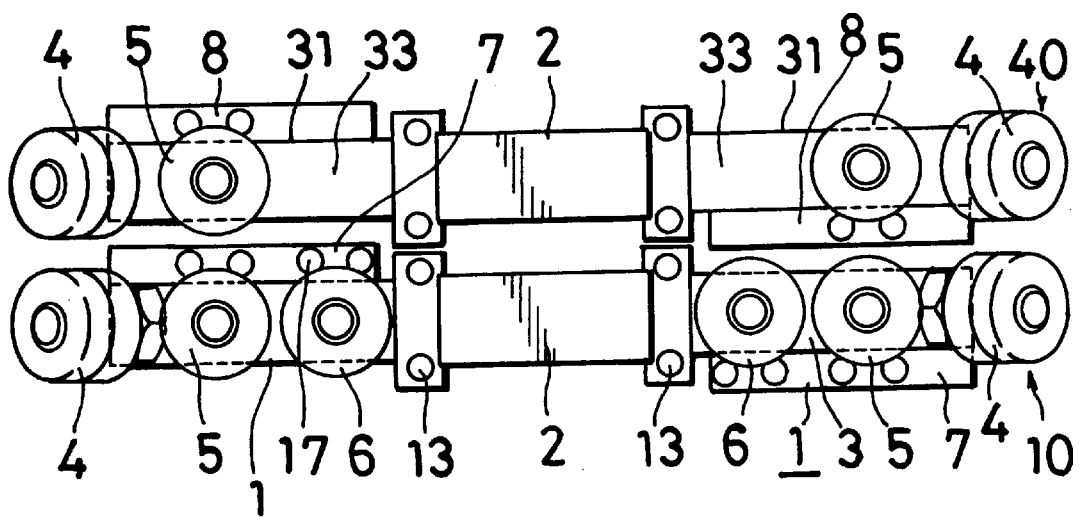
FIG. 9 is a plan view showing an embodiment comprising a plurality of shutoff-opening devices of the invention.

The fluid control devices 10, 40 shown in FIGS. 3, 4 and 6 are used in a suitable combination to provide a fluid control apparatus for use in fabricating semiconductors. FIG. 9 shows an example of such fluid control apparatus. With reference to the drawing, the fluid control device 40 including shutoff-opening devices 31 each having two valve actuators 4, 5 is disposed in parallel to the fluid control device 10 including shutoff-opening devices 1 each having three valve actuators 4, 5, 6 without no spacing formed between the two devices 40, 10. Although not shown, another similar fluid control device can be disposed in parallel to these devices 10, 40 without being spaced apart therefrom.

Thus fluid control apparatus can be provided wherein these fluid control devices 10, 40 are in a planar or flat arrangement, with the first actuators 4 of the shutoff-opening devices 1, 31, as well as the second actuators 5 thereof, arranged in alignment with one another. Further the piping means 15, 16, 27, 26 for the second and third subchannels 23, 24 are provided under a base plate 29 (rear side of the drawing) without increasing the width of the overall control apparatus. These piping portions 15, 16, 27, 28 are easy to maintain and appear neat.

Figure 10:
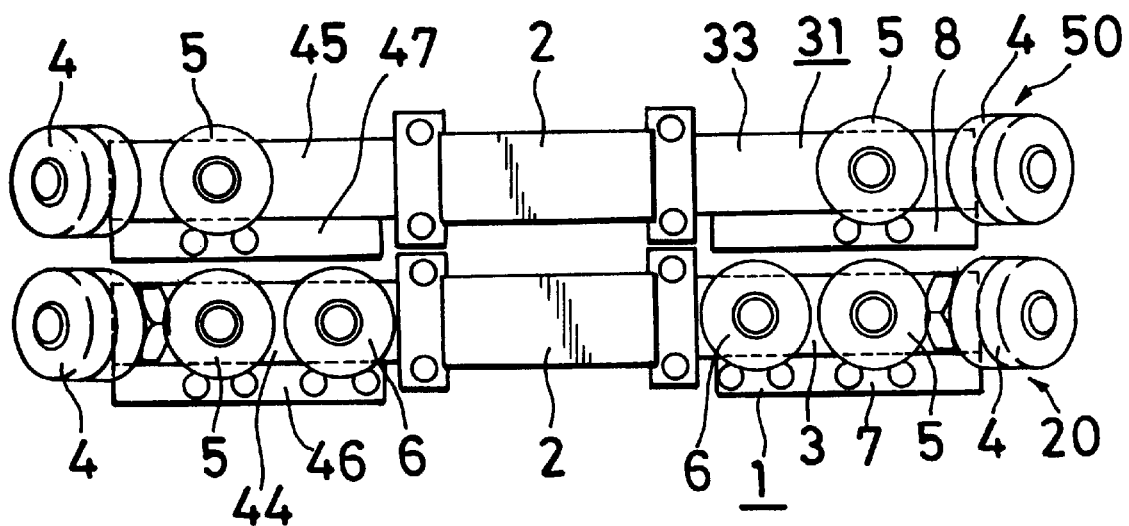
FIG. 10 is a plan view showing another embodiment comprising a plurality of shutoff-opening devices of the invention.

According to the arrangement shown in FIG. 9, the same shutoff-opening devices 1 or 31 are disposed at the inlet side and the outlet side of each massflow controller 2, and the extensions 7, 8 of the valve main bodies 3, 33 are provided at left on the inlet side and at right on the outlet side. On the other hand, FIG. 10 shows a fluid control apparatus wherein extensions 46, 47 of valve bodies 44, 45 at the inlet side and the extensions 7, 8 of the valve bodies 1, 31 at the outlet side are similarly arranged at right. These inlet-side valve main bodies 44, 45 are available, for example, merely by changing the position of the extension 7 on the right side as shown in FIG. 1 to the left side and causing the main channel 21 to communicate with the channels in the interior of the extension 7. With this arrangement, the second and third subchannels 23, 24 are all made to communicate with openings in the underside, while the openings are all positioned at the right side of the valve main bodies, consequently assuring facilitated piping work.

When the shutoff-opening devices 1, 31, 41, 51 according to the first to fourth embodiments are to be used, lower channel blocks 12 are necessary for connecting the massflow controller 2 to the shutoff-opening devices 1, 31, 51 as shown in FIG. 3 or 6. The lower channel block 12 is fastened to the valve main body 3 with the device installing screws 14 driven in through the lower block 12 horizontally. In removing the shutoff-opening device 1, 31, 41 or 51, these screws 14 and piping installing screws 17 need to be removed, whereas the removal of the device installing screws 14 requires a very cumbersome procedure in the case where many control devices 10, 40, or 20, 50 have been assembled as arranged in parallel into a fluid control apparatus (see FIG. 9 or 10).

Two embodiments will be described below which ensure facilitated removal of the shutoff-opening devices.

Figure 11:
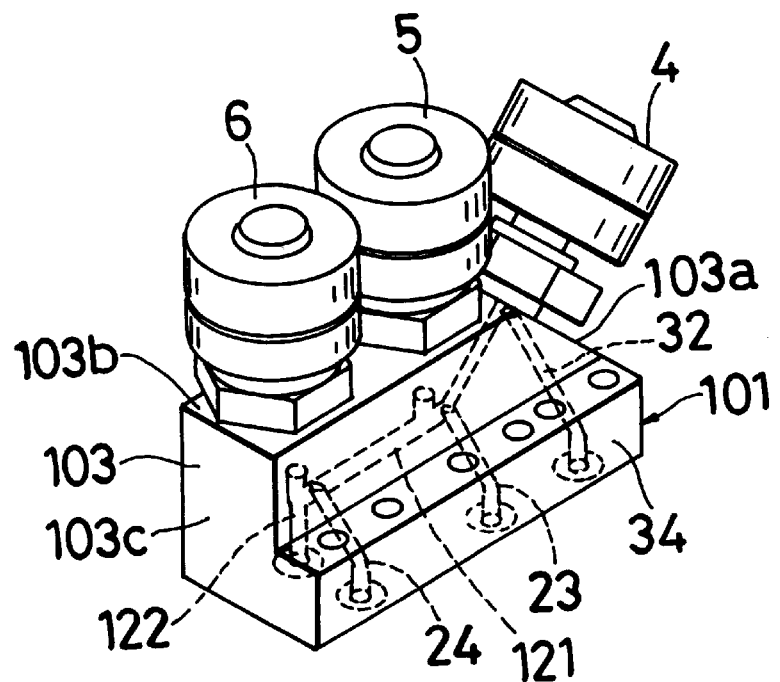
FIG. 11 is a perspective view showing a fifth embodiment of shutoff-opening device of the invention.
Figure 12:
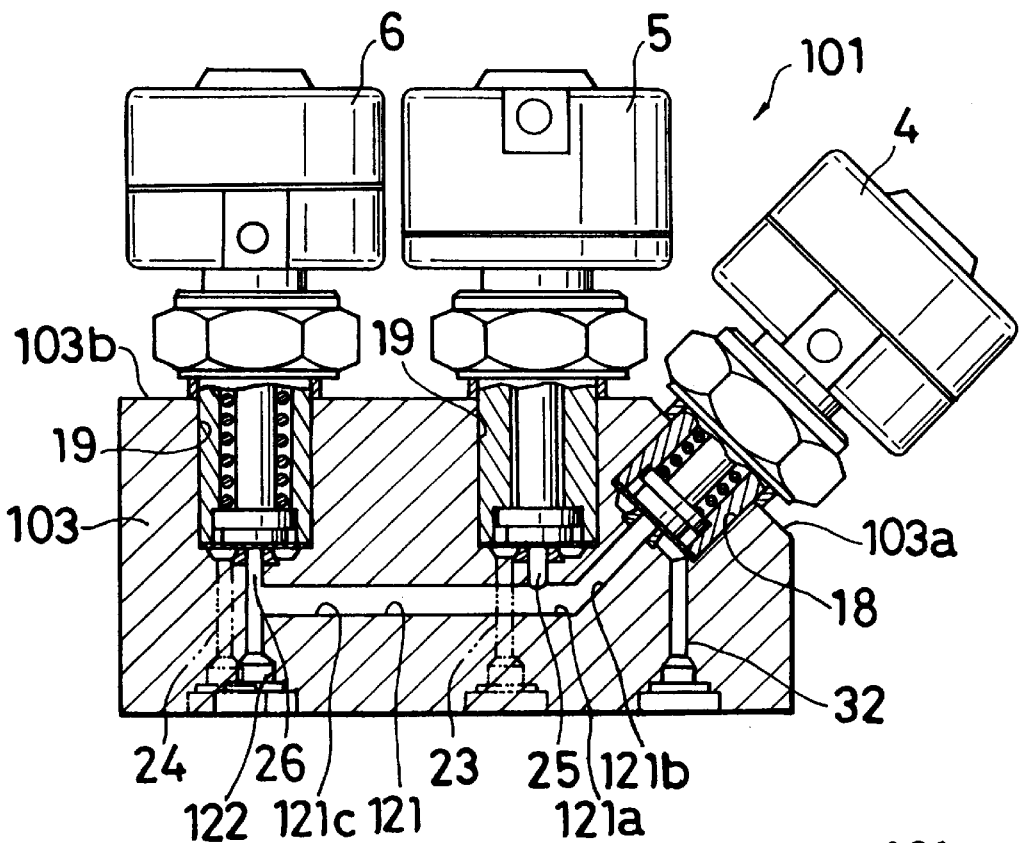
FIG. 12 is a view in longitudinal section of the same.

FIGS. 11 and 12 show a fifth embodiment of shutoff-opening device of the invention. This shutoff-opening device 101 has the same construction as the shutoff-opening device 31 of the second embodiment shown in FIG. 5 except that a main channel 121 has no opening in a rear end face 103c but communicates with an opening formed in the lower surface of a valve main body 103 by way of a downward channel 122 provided in the body 103.

Throughout the drawings showing the first, second and the following embodiments, like parts are designated by like reference numerals or symbols and will not be described repeatedly.

With reference to FIGS. 11 and 12, the valve main body 103 is internally formed with the above-mentioned main channel 121 which extends from a portion close to the rear end of the body 103 nearly to the front end thereof, and first (front-end), second (intermediate) and third (rear-end) subchannels 32, 23, 24 communicating with the main channel 121 via respective valve actuators 4, 5, 6. The main channel 121 has the downward channel 122, which extends straight from the rear end of the channel 121 downward and has an opening in the lower surface rear end portion of the body 103. The subchannels 32, 23, 24 extend through a blocklike extension 34 of the valve main body 103 and are open at the lower surface of the body 103. The upper surface of the valve main body 103 includes a mount face 103a which is in the form of a slanting face extending forwardly downward and having the front-end first valve actuator 4. The other portion of the surface is a mount face 103b for the other two second and third valve actuators 5, 6.

With reference to FIG. 12, the dead volume of the shutoff-opening device 101 is only the short channels 25, 26 connecting the main channel 121 to the respective second and third valve actuators 5, 6 when a fluid flows from the main channel 121 into the first subchannel 32. When the fluid flows from the main channel 121 into the second subchannel 23, the dead volume is the short channel 26 connecting the main channel 121 to the third actuator 6, and front end portions 121a, 121b of the main channel 121 which are positioned between the first and second actuators 4, 5, forming an obtuse angle. When the fluid flows from the main channel 121 into the third subchannel 24, the dead volume is the short channel 25 connecting the main channel 121 to the second actuator 5, the main channel front end portions 121a, 121b positioned between the first and second actuators 4, 5, and an intermediate portion 121c of the main channel 121 positioned between the second and third actuators 5, 6.

Figure 13:
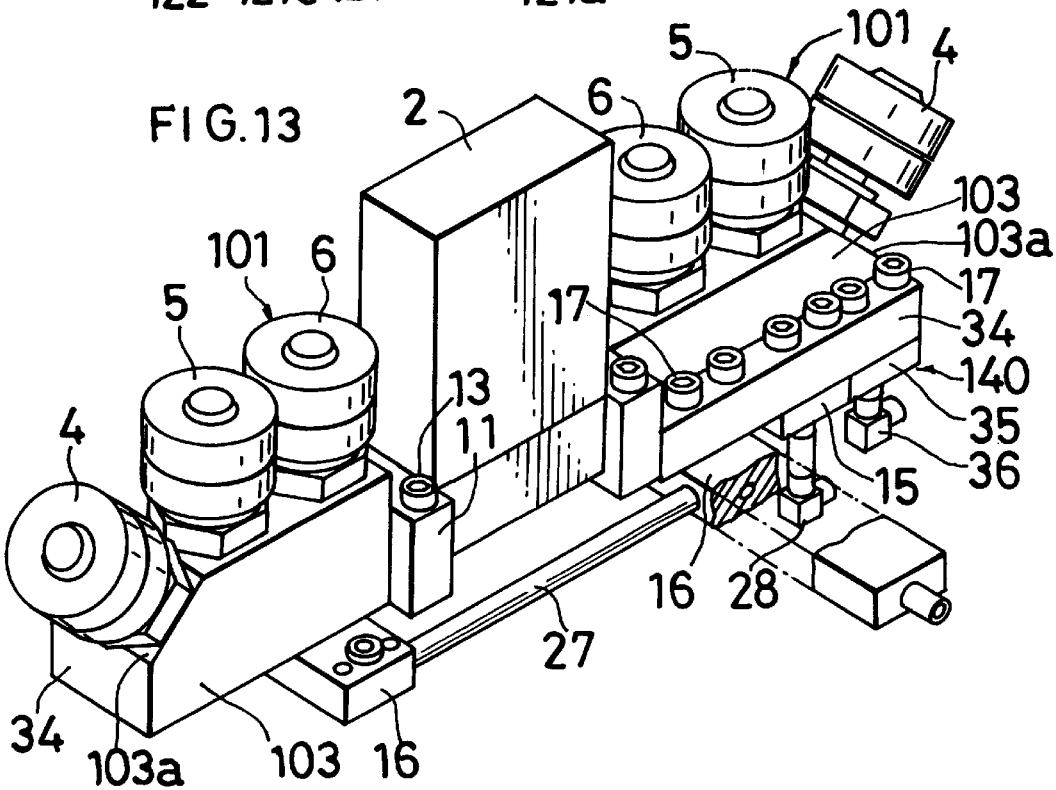
FIG. 13 is a perspective view showing a fluid control device embodying the invention and comprising shutoff-opening devices according to the fifth embodiment.
Figure 14:
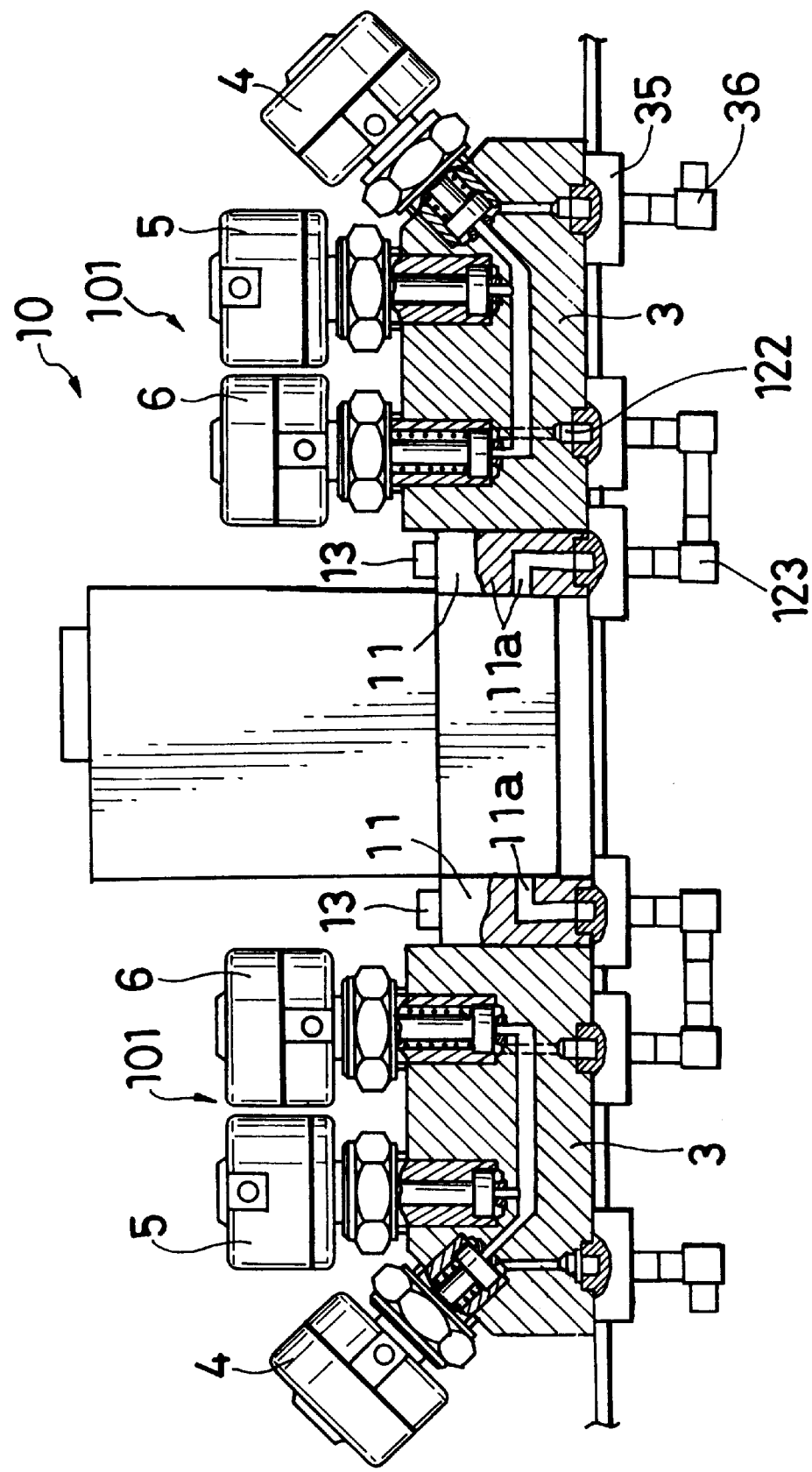
FIG. 14 is a view in longitudinal section of the same.

FIGS. 13 and 14 show a fluid control device 140 comprises two shutoff-opening devices 101. The device 140 shown in FIG. 13 is characterized in that unlike the fluid control device 10 shown in FIG. 3, the device 140 has no lower channel blocks 12 and therefore none of the device installing screws 14 horizontally driven through the blocks 12. Each channel block 11 joined to a massflow controller 2 has a channel 11a, which has a lower opening and is held in communication with the downward channel 122 by a pipe fitting 123 below the valve main body 103.

In this way, the space under the valve main body 103 is used for piping not only for the first, second and third subchannels 32, 23, 24 but also for the main channel 121, whereby the devices, such as the massflow controller 2 and shutoff-opening devices 101, which are mounted on the upper side of a base plate 29 are completely separated from the piping means, such as channel blocks 15, 16, 35, fittings 28, 36 and pipe 27, which are-arranged under the plate 29. If the massflow controller 2 of the fluid control device 140 malfunctions, the controller 2 is removable upward for replacement by removing the controller installing screws 13. Further if the shutoff-opening device 101 fails, the device 101 can be removed upward for replacement by removing the piping installing screws 17 and the piping installing screws 17. The piping portion can then be in a flat arrangement under the valve main body, compacting the control apparatus in its entirety and assuring the component devices and the piping means of greatly facilitated maintenance.

Figure 15:
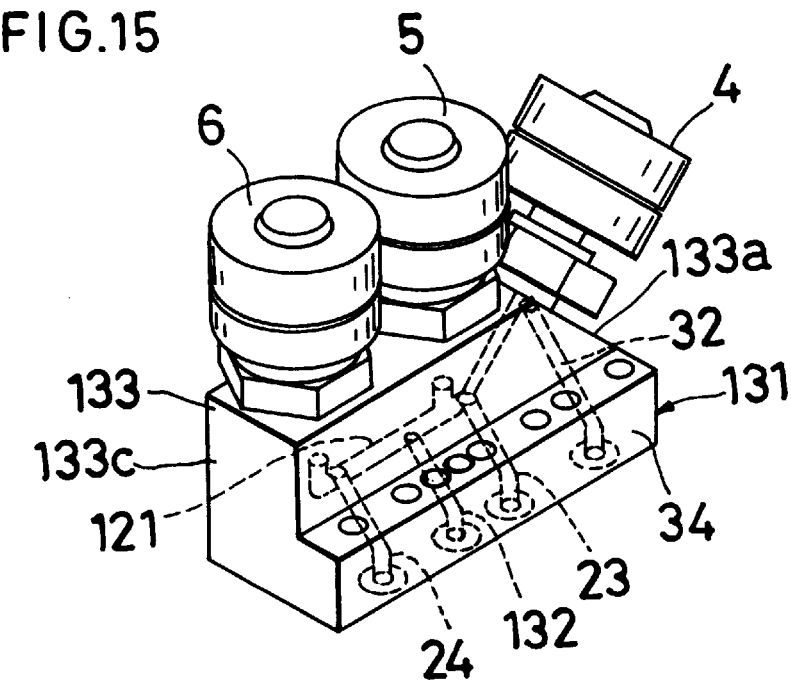
FIG. 15 is a perspective view showing a sixth embodiment of shutoff-opening device of the invention.
Figure 16:
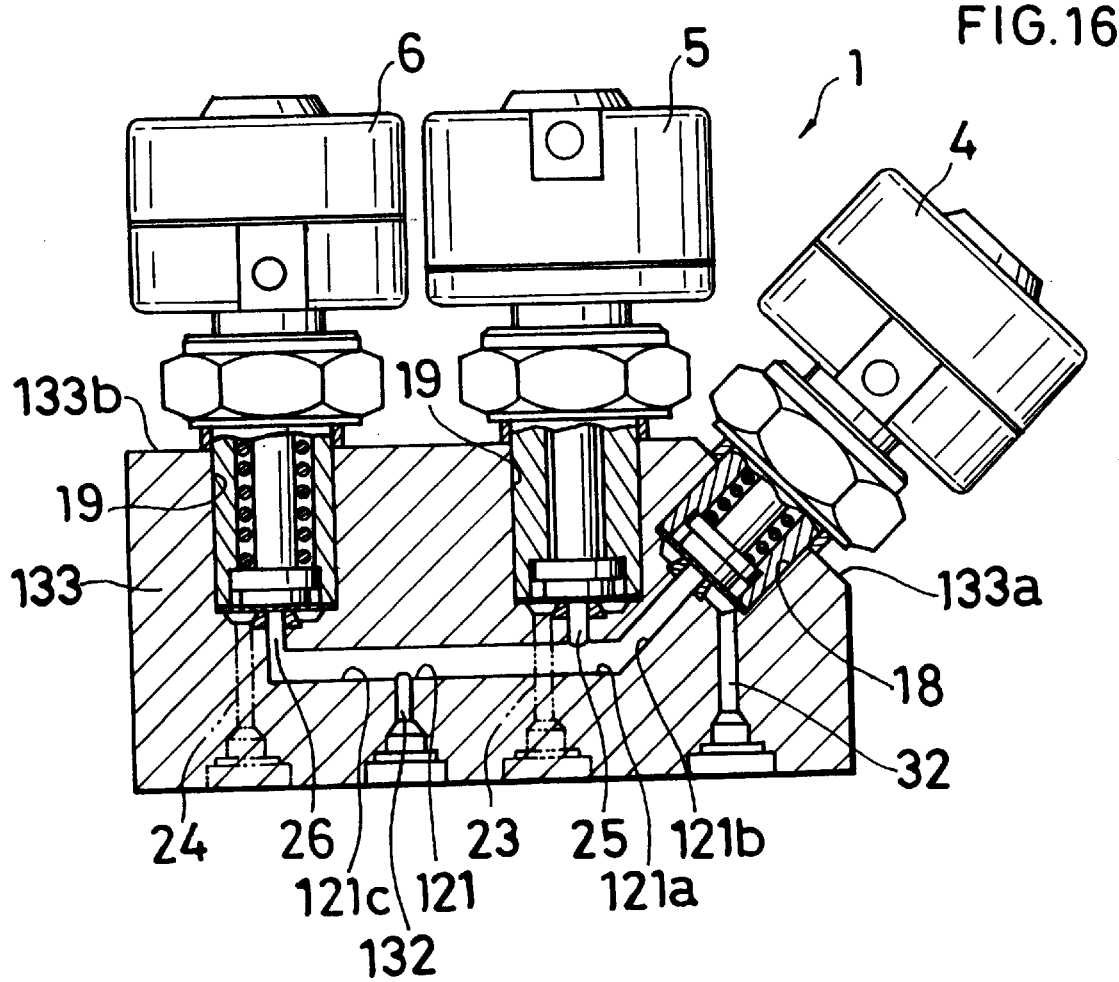
FIG. 16 is a view in longitudinal section of the same.

FIGS. 15 and 16 show a sixth embodiment of shutoff-opening device of the invention. This shutoff-opening device 131 is similar to the shutoff-opening device 101 of fifth embodiment shown in FIGS. 11 and 12 in that the main channel 121 has no opening in a rear end face 133c but communicates with an opening formed in the lower surface of a valve main body 133 via a downward channel 132 formed in the body 133. The shutoff-opening device 131 differs from the device 101 in that the downward channel 132 extends from an intermediate portion of the main channel 121 (between the second and third actuators 5, 6) to the opening in the lower surface of the valve main body 133 through a blocklike extension 34 of the body 133. The shutoff-opening device 131 provides a fluid control device, which has the same feature as the fluid control device 140 shown in FIGS. 13 and 14.

Incidentally, shutoff-opening devices 1, 31, 41, 51, 101, 131 may of course be attached to devices other than the massflow controller 2, and are of course usable for passing liquids instead of gases.

What is claimed is:

1. A shutoff-opening device comprising:
   a valve main body formed as a generally rectangular parallelepiped having substantially parallel upper and lower surfaces joined at their opposite ends by front and rear end surfaces;
   said valve main body being formed internally with a main channel having an inlet opening disposed on said rear end surface of said valve main body or a rear end portion of the lower surface of said valve main body and extending along a straight line from said rear end surface toward said front end surface;
   a plurality of channel on-off actuators being mounted in side-by-side relation on mounting faces disposed longitudinally of said upper surface with central axes of said actuators being perpendicular to said mounting faces;
   a short channel extending from a seat of each actuator in axial alignment with a central axis thereof into communication with said main channel and cooperating with said main channel to form a dead volume when said actuators are in a closed condition; and
   said upper surface of said valve main body at the front end thereof having a front end valve actuator mounting face slanting forwardly downward, whereby the cumulative length of said short channel and said main channel extending to said front end valve actuator and forming a dead volume is less than the dead volume were said front end valve actuator disposed with its axis parallel to that of an adjacent valve actuator.

2. A shutoff-opening device comprising:
   a generally rectangular parallelepipedal valve main body including generally parallel upper and lower surfaces joined at their opposite ends by end surfaces:
   a plurality of channel on-off valve actuators mounted substantially in-line on said upper surface of the valve main body and each having a valve actuator stem movable in a direction substantially perpendicular to said valve main body upper surface to selectively open and close communication between a short channel axially aligned with said valve actuator stem and a plurality of subchannels;
   a main channel extending within the interior of said valve main body from an inlet opening at one end of said valve main body toward the other end thereof, said main channel interconnecting said short channels and being operative to interconnect a selected subchannel with an associated short channel via actuation of the associated valve actuator;
   the other end of said valve main body being formed as a slanting surface extending downwardly in a direction toward said bottom surface of said valve main body, and
   said slanting surface mounting a valve actuator thereon, wherein said valve actuator stem is substantially perpendicular to said slanting surface and said short channel extends from said valve actuator on said slanting surface declinedly in a direction toward the short channel of an adjacent valve actuator into communication with a portion of said main channel extending from said adjacent valve actuator, whereby the cumulative length of said short channel and said main channel extending toward said valve actuator on said slanting surface forms a dead volume which is less than the dead volume were said valve actuator on said slanting surface disposed with its stem parallel to that of a valve actuator mounted on said upper surface of said valve main body.

3. A fluid control device comprising a shutoff-opening device as defined in either claim 1 or claim 2 in which said shutoff-opening device is disposed at each of an inlet side and an outlet side of a controller for regulating the pressure or flow rate of fluids.

4. A fluid control apparatus comprising fluid control devices as defined in claim 3 and arranged side by side, the valve main bodies of the shutoff-opening devices being equal in front-to-rear length irrespective of the number of valve actuators mounted on the respective upper surfaces thereof.

5. A fluid control apparatus as defined in claim 4 which is characterized in that the subchannel included in the subchannels of each shutoff-opening device and communicating with the main channel via the front-end valve actuator has an opening formed in a front end face of the valve main body, the other subchannel or subchannels having an opening in the lower surface of the valve main body, piping for said other subchannel or subchannels being provided below the main body.

6. A fluid control apparatus as defined in claim 4 which is characterized in that each subchannel of each shutoff-opening device has an opening formed in the lower surface of the valve main body, piping for each subchannel being provided below the main body.

* * * * *